Jan. 9, 1923.

F. J. BULLIS.
PUSHING APPARATUS.
ORIGINAL FILED NOV. 20, 1920.

F. J. Bullis, INVENTOR

BY Victor J. Evans
ATTORNEY

WITNESS

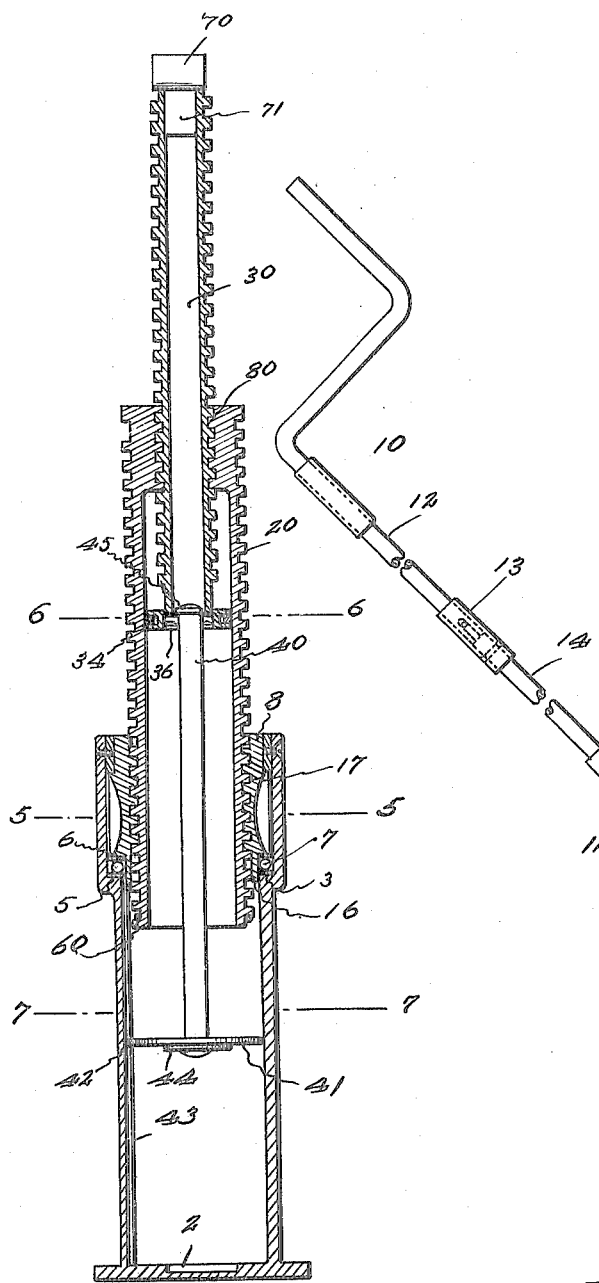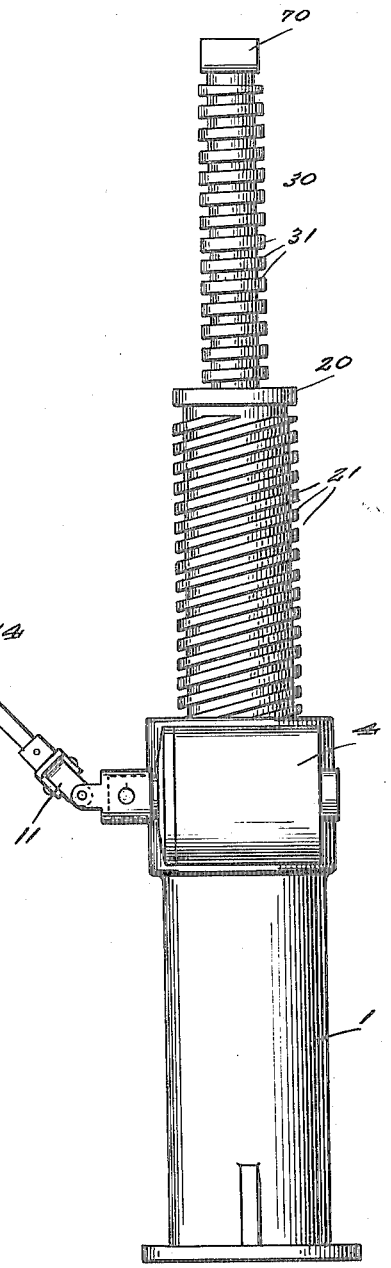

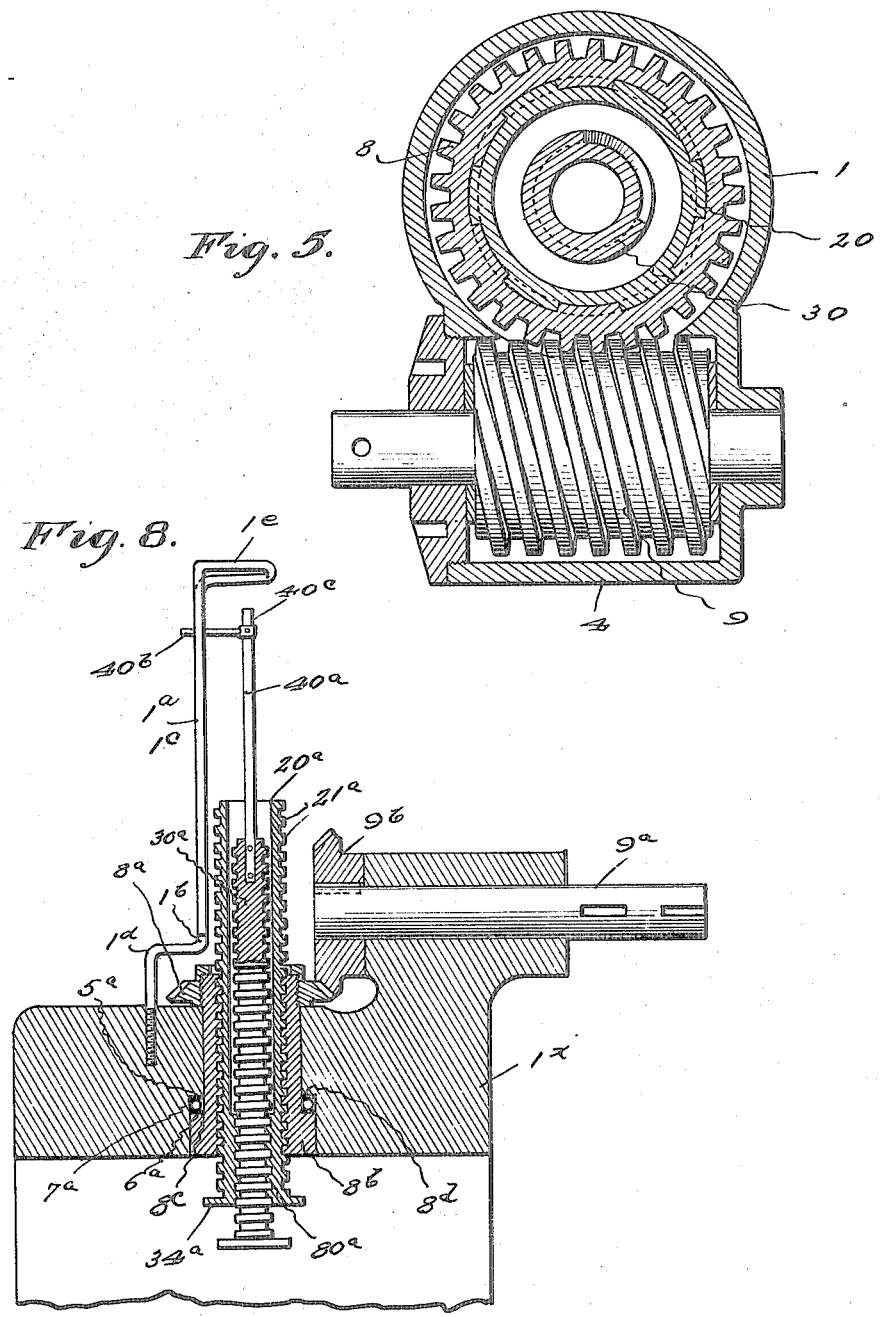

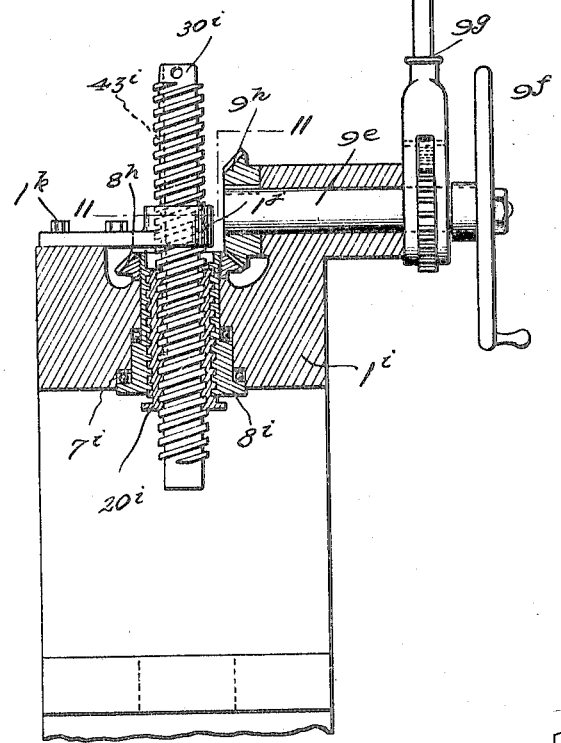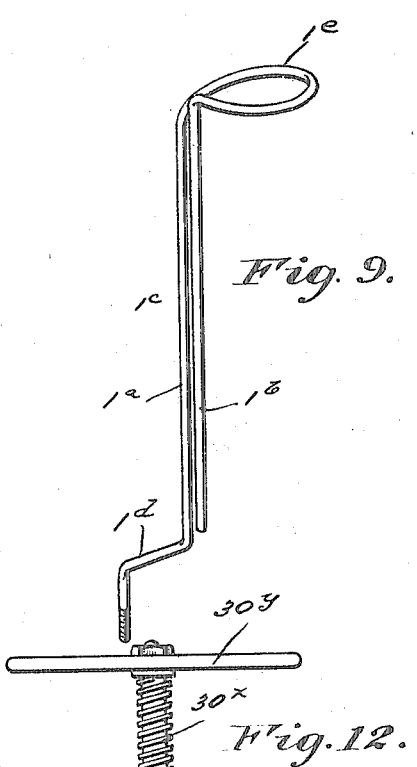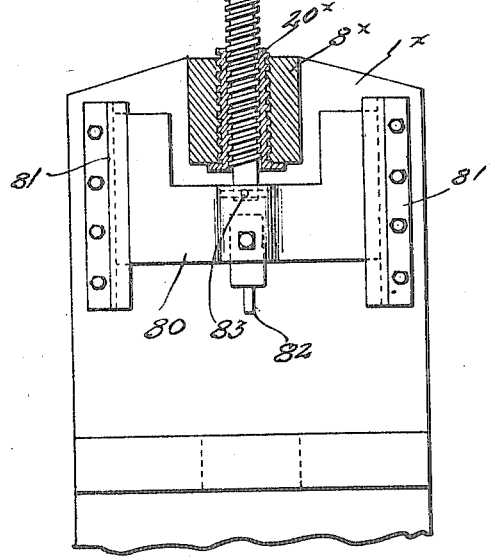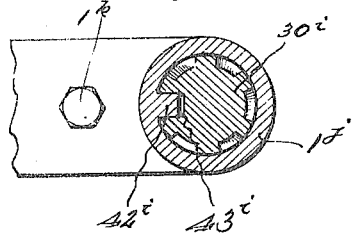

Patented Jan. 9, 1923.

1,441,963

UNITED STATES PATENT OFFICE.

FREDERICK J. BULLIS, OF STILLWATER MINNESOTA.

PUSHING APPARATUS.

Application filed November 20, 1920, Serial No. 425,460. Renewed May 12, 1922. Serial No. 560,454.

*To all whom it may concern:*

Be it known that I, FREDERICK J. BULLIS, a citizen of the United States, residing at Stillwater, in the county of Washington and State of Minnesota, have invented new and useful Improvements in Pushing Apparatus, of which the following is a specification.

The object of my present invention is the provision of powerful, quick acting and otherwise materially advantageous pushing apparatus.

To the attainment of the foregoing, the invention consists in the improvement as hereinafter described and definitely claimed.

In the accompanying drawings, forming part hereof:—

Figure 3 is a sectional view showing the apparatus as partially extended to a greater extent than Figure 2.

Figure 4 is a side elevation of the same.

Figure 6:
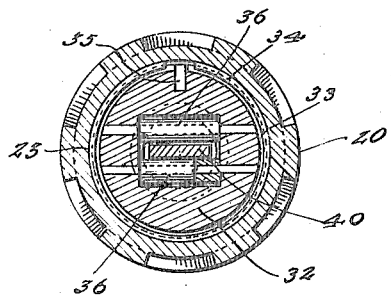
Figure 7:
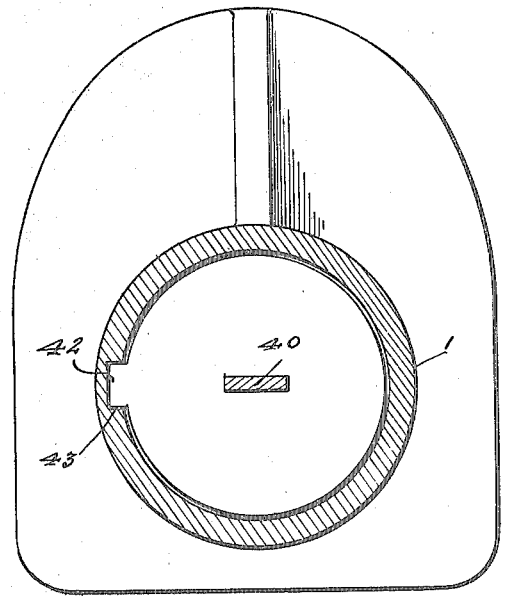
Figures 1, 2:
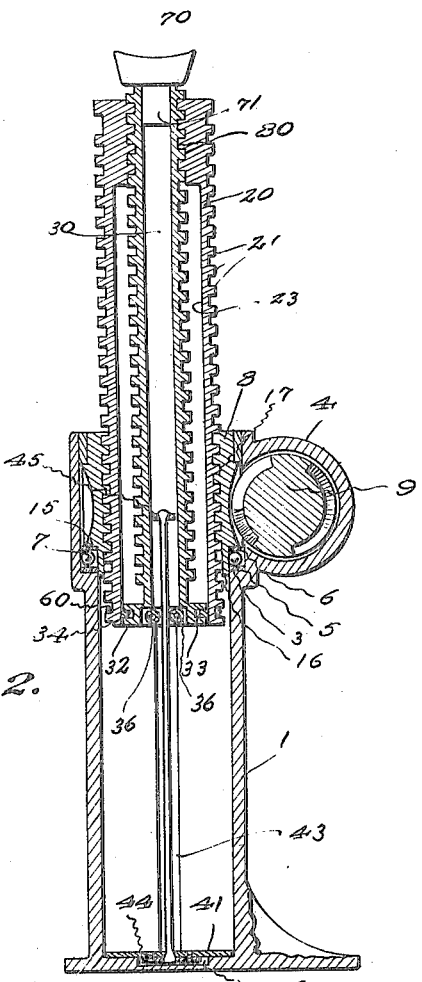
Figure 1 is a vertical section showing my novel pushing apparatus in the form of a jack and as the same appears when reduced in compass.
Figure 2 is a similar view showing the apparatus as partially extended.

Figures 5, 6 and 7 are enlarged transverse sections taken in the planes indicated by the lines 5—5, 6—6 and 7—7, respectively, of Figure 3.

Figure 8 is a vertical section illustrating my invention as embodied in a press.

Figure 9 is a perspective of a part of said press.

Figure 10 is a section showing another embodiment of my invention in press form.

Figure 11 is a detail transverse section taken in the plane indicated by the line 11—11 of Figure 10.

Figure 12 is a view, partly in elevation and partly in section, showing my invention as embodied in a punching device.

Similar numerals designate corresponding parts in Figures 1 to 7 to which reference will first be made.

Among other elements my novel jack-form pushing apparatus includes a stand or frame 1. The said stand or frame is provided in the upper side of its bottom with a recess 2, and is also provided at an intermediate point of heights with an interior ledge or support 3. Above the said support 3 the stand 1 is provided with a side housing 4.

Superimposed on the interior ledge or support 3 of the stand 1 is a washer 5, preferably of steel, and arranged above and spaced from the said washer 5 is a similar washer 6. Between the said washers 5 and 6 are a plurality of anti-friction balls 7.

Mounted to rotate about its axis in the upper portion of the stand 1 is a sleeve-like worm gear 8 which is intermeshed with a worm 9, appropriately mounted in the housing 4 and adapted to be turned about its axis through the medium of the handle 10 illustrated in Figure 4 or through the medium of any other desired means. The said handle 10 is preferably provided with an universal joint 11 and is also provided with an upper section 12, detachable at 13 from the lower section 14. The worm gear 8 is provided with an exterior abutment 15 to bear on the upper washer 6, and it is also provided with the pendent annular flange 16 which rests within and snugly against the inner edges of the washers 5 and 6 and is adapted to prevent lubricant from reaching the lower part of the interior of the stand 1. This will be appreciated as a material advantage when it is pointed out that it is not desirable to lubricate the exterior thread of the outer screw hereinafter described. It will also be manifest that the said skirt flange 16 serves in combination with the stand wall and the washers 5 and 6 in the proper confinement of the anti-friction balls 7 so as to enable the latter to work to the best advantage. Interiorly the worm gear 8 is threaded as indicated by 17.

In addition to the elements thus far described the jack-form pressing apparatus comprises an outer screw 20, an inner screw 30, and a key member 40. The outer screw 20 is provided with an exterior fast thread 21 of about the pitch illustrated in Figure 4, and the inner screw 30 is provided with an exterior slow thread 31 of about the pitch shown in Figure 4. The thread 21 is engaged or intermeshed with the interior thread of the worm gear 8, and near its lower end the outer screw 20 is provided with a ring 60, seated in a circumferential groove 61 of the screw and designed to bring about against the interior thread of the worm gear 8 and serve as a stop in preventing withdrawal of the outer screw 20 from the gear 8. At its upper end the inner screw 30 is provided with a rest 70 having a shank 71 socketed in the upper end of the screw. This, however, is not of the essence of my invention since it is manifest that the screw 30 may be provided at its upper end with any appropriate means to rest under an object to be lifted. The inner screw 30 is provided at its lower end with a disk 32 in which is a circumferential groove 33 that receives a split spring ring 34 which has a tendency to press outwardly against the smooth bore wall 23 of the outer screw 20 so as to create considerable frictional contact between the inner screw 30 and the outer screw 20. As illustrated in Figure 6 the disk 32 is provided with a radial pin 35 which rests between the ends of the ring 34 and is designed to prevent the ring from working around in the circumferential groove 33. Carried in the disk 32 are parallel spaced anti-friction rollers 36. Between the said rollers 36 is arranged the before mentioned key 40 which is of angular form and preferably oblong in cross section as clearly shown in Figures 6 and 7. At its lower end the key 40 is provided with a head 41 on which is a radial projection 42, movable rectilinearly in a groove or guideway 43 in the stand 1, whereby the key 40 is free to move upwardly and downwardly but is held against turning about its axis. The connection of the head 41 to the key 40 is preferably reinforced by a disk 44 at the underside of the head 41, and the before mentioned recess 2 in the upper side of the stand bottom is provided for the reception of the said disk 44 when the head 41 is in its lowermost position, Figures 1 and 2. The key 40 is provided at its upper end with an enlargement 45, designed to cooperate with the anti-friction rollers 36 for the lifting or "pick up" of the key 40 by the inner screw 30.

In the practical operation of the jack-form embodiment thus far described in detail, it will be understood that rotation of the worm 9 about its axis will be attended by rotation of the worm gear 8 about its axis and a quick rectilinear movement of the outer screw 20 upwardly or downwardly through the worm gear 8, according to the direction in which the worm 9 is turned. When the outer screw 20 is moved upwardly, for instance, the key 40 will hold the inner screw 30 against rotation, and the frictional contact created by the spring ring 34 between the inner screw 30 and the outer screw 20 will prevent rotation of the said outer screw 20. By the quick upward movement of the outer screw 20 carrying with it the inner screw 30, the rest 70 may be quickly elevated and positioned under the weight to be lifted. At this time continued rotation of the worm 9 and the worm gear 8 will be attended by rotation of the outer screw 20 about its axis with the result that the inner screw 30 will be fed rectilinearly upward through the threaded bore 80 of the outer screw 20, and in consequence the weight superimposed on the rest 70 will be powerfully lifted. The rotation of the outer screw 20 about its axis when weight is imposed on the rest 70 is due to the holding of the inner screw 30 against turning about its axle, and the friction created by the weight on the rest 70, between the interior thread of the worm gear 8 and the exterior thread 21 of the outer screw 20. This is why it is desirable to prevent lubricant from passing from the housing 4 and the ball race into the stand 1. After use of the jack-form embodiment it is simply necessary in order to return the parts to the position shown in Figure 1 to reverse the direction of rotation of the worm 9, since when this is done, the outer screw 20 will first be retracted rectilinearly into the stand by rotation of the worm gear 8 about its axis, and then by rotation of the outer screw 20 with the worm gear 8 the inner screw 30 will be retracted into the outer screw 20 as appears in Figure 1.

Manifestly my novel jack type of apparatus is calculated to afford a quick pick up movement and a slow and powerful pressure movement.

In the press type embodiment of my invention shown in Figures 8 and 9 a shaft $9^a$ is journaled in a stand $1^x$ to be rotated by any appropriate means, and the said shaft $9^a$ is equipped at its inner end with a miter gear $9^b$. The said miter gear $9^b$ is intermeshed with a miter gear $8^a$ appropriately fixed to an interiorly threaded gear $8^b$ on which is an interior abutment $8^c$. Interposed between the said abutment $8^c$ and an opposed abutment $8^d$ are upper and lower steel washers $5^a$ and $6^a$ between which are anti-friction balls $7^a$. Arranged in the interiorly threaded gear $8^b$ is an outer screw $20^a$ with a stop flange $34^a$ at its lower end. Said screw $20^a$ is provided with an exterior thread $21^a$ and an interior thread $80^a$. The interior thread is for the engagement of the thread of the inner screw $30^a$, fixed to which is a key stem $40^a$ on which is a lateral arm $40^b$. The said arm $40^b$ is movable rectilinearly between the parallel portions $1^a$ and $1^b$ of an upright $1^c$, which upright also comprises an arm $1^d$ at the lower end of the portion $1^a$ and fixed to the stand $1^x$, and a loop $1^e$ carried by the upright portions $1^a$ and $1^b$ and having a mouth in communication with the space between said portions $1^a$ and $1^b$. The arm $40^b$ is preferably fixed in adjustable manner at $40^c$ on the key stem $40^a$. The loop $1^e$ is preferably pitched at about the same angle as the thread on the outer screw $20^a$.

In the practical operation of the press embodiment shown in Figures 8 and 9 it will be manifest that rotation of the shaft $9^a$ will be attended by rotation of the gear $8^b$ with the result that the screw $20^a$ and the screw $30^a$ will be quickly fed rectilinearly downward until the screw 30ª meets with the resistance of the work when the screw 20ª will be turned about the screw 30ª to slowly and powerfully continue the downward movement of the latter. On reverse rotation of the shaft 9ª, the screws 20ª and 30ª will be retracted, and the screw 30ª will be moved upwardly through the screw 20ª until the arm 40ᵇ moves upwardly out of the space between the portions 1ª and 1ᵇ of the upright 1ᶜ when said arm 40ᵇ will simply idle above the loop 1ᵉ and hence there will be no further upward movement of the screw 30ª. When, however, the shaft 9ª is again turned to feed the screws 20ª and 30ª downwardly as a unit the arm 40ᵇ will be moved downwardly in the space between the upright portions 1ª and 1ᵇ.

In the press embodiment shown in Figures 10 and 11 the shaft 9ᵉ is provided with a crank wheel 9ᶠ for the quick turning thereof and with ratchet means 9ᵍ for the slow and powerful rotation of the shaft.

At its inner end the shaft 9ᵉ is provided with a miter gear 9ʰ that is intermeshed with a miter gear 8ʰ on a gear 8ⁱ, journaled in the stand 1ⁱ and opposed by preference to two anti-friction bearings 7ⁱ as shown in Figure 10. Threaded through the gear 8ⁱ is an outer screw 20ⁱ, and threaded in the outer screw 20ⁱ is an inner screw 30ⁱ. The said screw 30ⁱ is provided with a longitudinal groove 43ⁱ to receive a key 42ⁱ in a collar 1ʲ, fixed at 1ᵏ to the stand 1ⁱ. The operation of this press embodiment is generally similar to the press embodiment shown in Figure 8 and need not therefore be described in detail, except to say that the thread of the screw 30ⁱ is a fast thread, and the thread of the screw 20ⁱ is a slow thread.

In Figure 12 I illustrate a punch embodiment in which a reciprocatory head 80 is guided in ways 81 and is provided with a punch 82. To the said head 80 is connected in swiveled manner at 83 a screw 30ˣ with a hand wheel 30ʸ at its upper end. Said screw 30ˣ is threaded through an outer screw 20ˣ, and said outer screw 20ˣ, in turn, is threaded in a stationary interiorly threaded sleeve 8ˣ in the stand 1ˣ. In this embodiment the thread of the screw 30ˣ is a fast thread, and that of the screw 20ˣ is a slow thread. Therefore when the screw 30ˣ is turned to move the head 80 downwardly, the screw 30ˣ will feed through the screw 20ˣ until the punch brings up against the work whereupon the screw 20ˣ and the screw 30ˣ will be fed downwardly as a unit in the bearing of the screw 20ˣ.

Having described my invention, what I claim and desire to secure by Letters-Patent, is:—

1. In a pushing apparatus, the combination of an outer exteriorly and interiorly threaded screw, means through which said screw is threaded, an inner screw threaded in the outer screw, means to turn one of said screws, and means to hold the other screw against turning about its axis without interfering with rectilinear movement thereof; one of the screws having a fast thread and the other a slow thread.

2. In a pushing apparatus, the combination of a stand, an interiorly threaded gear journaled and held against endwise movement therein, means to rotate said gear, an outer exteriorly and interiorly threaded screw threaded through said gear, an inner screw threaded in the outer screw, and means to hold the inner screw against turning about its axis without interfering with rectilinear movement thereof; one of the screws having a fast thread and the other a slow thread.

3. In a pushing apparatus, the combination of a stand, an interiorly threaded gear journaled and held against endwise movement therein, means to rotate said gear, an outer exteriorly and interiorly threaded screw threaded through said gear, an inner screw threaded in the outer screw, and means to hold the inner screw against turning about its axis without interfering with rectilinear movement thereof; one of the screws having a fast thread and the other a slow thread, and the gear being intermeshed with a second gear to transmit rotary motion to the first gear.

4. In a pushing apparatus, the combination of a stand, an interiorly threaded gear journaled and held against endwise movement therein, means to rotate said gear, and an outer exteriorly and interiorly threaded screw threaded through said gear, an inner screw threaded in the outer screw, and means to hold the inner screw against turning about its axis without interfering with rectilinear movement thereof; one of the screws having a fast thread and the other a slow thread, and the gear being arranged to thrust endwise against an anti-friction bearing in the stand.

5. In a pushing apparatus, the combination of a stand provided with a longitudinal guideway, an interiorly threaded gear journaled and held against endwise movement in the stand, means to rotate said gear, an outer exteriorly and interiorly threaded screw threaded through said gear, an inner screw threaded in the outer screw, and a key movable with the inner screw and also movable in said guideway to hold the inner screw against turning about its axis while permitting of rectilinear movement of the inner screw; the exterior thread of the outer screw being relatively fast.

6. In a pushing apparatus, the combination of a stand provided with a longitudinal guideway, an interiorly threaded gear journaled and held against endwise movement in the stand, means to rotate said gear, an outer exteriorly and interiorly threaded screw threaded through said gear, an inner screw threaded in the outer screw, and a key movable with the inner screw and also movable in said guideway to hold the inner screw against turning about its axis while permitting of rectilinear movement of the inner screw; the exterior thread of the outer screw being relatively fast, and a gear being arranged to thrust endwise against an anti-friction bearing in the stand.

7. In a pushing apparatus, the combination of a stand provided with a longitudinal guideway, an interiorly threaded gear journaled and held against endwise movement in the stand, means to rotate said gear, an outer exteriorly and interiorly threaded screw threaded through said gear, an inner screw threaded in the outer screw, and a key movable with the inner screw and also movable in said guideway to hold the inner screw against turning about its axis while permitting of rectilinear movement of the inner screw; the exterior thread of the outer screw being relatively fast, the said guideway being formed in the stand, and a key being slidably connected with the inner screw and being provided with a head movable in the stand and having a radial projection movable in said guideway.

8. In a pushing apparatus, the combination of a stand, a gear held against endwise movement in the stand and having an interiorly threaded bore, an outer exteriorly and interiorly threaded screw extending through the said gear, an inner tubular and exteriorly threaded screw bearing in the inner screw, a key slidably engaged with the inner screw and arranged to telescope in said screw and hold the same against turning about its axis, and cooperating means of the stand and the key to permit rectilinear movement of the key while preventing movement of said key about its axis.

9. In a pushing apparatus, the combination of a stand, a gear held against endwise movement in the stand and having an interiorly threaded bore, an outer exteriorly and interiorly threaded screw extending through the said gear, an inner tubular and exteriorly threaded screw bearing in the inner screw, a key slidably engaged with the inner screw and arranged to telescope in said screw and hold the same against turning about its axis, and cooperating means of the stand and the key to permit rectilinear movement of the key while preventing movement of said key about its axis; the said key being of angular form in cross section and arranged between anti-friction rollers carried by the inner screw.

10. In a pushing apparatus, the combination of a stand, a gear held against endwise movement in the stand and having an interiorly threaded bore, an outer exteriorly and interiorly threaded screw extending through the said gear, an inner tubular and exteriorly threaded screw bearing in the inner screw, a key slidably engaged with the inner screw and arranged to telescope in said screw and hold the same against turning about its axis, and cooperating means of the stand and the key to permit rectilinear movement of the key while preventing movement of said key about its axis; the said gear being superimposed upon and adapted to thrust against anti-friction means in the stand, and being provided with a pendent skirt flange arranged within and close against the said anti-friction means.

11. In a pushing apparatus, the combination of a stand, a gear held against endwise movement in the stand and having an interiorly threaded bore, an outer exteriorly and interiorly threaded screw extending through the said gear, an inner tubular and exteriorly threaded screw bearing in the inner screw, a key slidably engaged with the inner screw and arranged to telescope in said screw and hold the same against turning about its axis, and cooperating means of the stand and the key to permit rectilinear movement of the key while preventing movement of said key about its axis; the inner screw having a circumferentially grooved disk movable in the outer screw, and yielding friction creating means disposed in said disk and exerting yielding pressure against the outer screw.

12. In a pushing apparatus, the combination of a stand, a gear held against endwise movement in the stand and having an interiorly threaded bore, an outer exteriorly and interiorly threaded screw extending through the said gear, an inner tubular and exteriorly threaded screw bearing in the inner screw, a key slidably engaged with the inner screw and arranged to telescope in said screw and hold the same against turning about its axis, and cooperating means of the stand and the key to permit rectilinear movement of the key while preventing movement of said key about its axis; the said inner screw being equipped within the upper screw with yielding friction creating means arranged to exert outward pressure against the outer screw.

13. In a pushing apparatus, the combination of a stand having a longitudinal interior key-way and also having an interior abutment, anti-friction means superimposed on said abutment, a housing fixed with respect to the stand, a worm gear arranged in the stand and on said anti-friction means and having a threaded bore, a worm mounted in the housing and intermeshed with said worm gear, an outer interiorly and exteriorly threaded screw threaded through the worm gear and having a smooth bore portion and also having a stop near its lower end to prevent its withdrawal from the worm gear, an inner exteriorly threaded tubular screw threaded through the outer screw and having a disk and friction creating means carried by the disk and exerting yielding pressure against the outer screw and also having spaced anti-friction rollers at its lower end, a key of angular form in cross section extending between said rollers and into the tubular inner screw and having an enlargement on its upper end and also having a disk slidable in the stand and provided with a projection movable rectilinearly in the guideway of the stand, whereby the key is enabled to move endwise and is also enabled to hold the inner screw against turning about its axis.

In testimony whereof I affix my signature.

FREDERICK J. BULLIS.